US008510461B2

(12) United States Patent
Klemets

(10) Patent No.: US 8,510,461 B2
(45) Date of Patent: Aug. 13, 2013

(54) NETWORK SELECTION FOR STREAMING MEDIA AMONG MULTIPLE DEVICES

(75) Inventor: Anders Edgar Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 98 days.

(21) Appl. No.: 13/229,768

(22) Filed: Sep. 12, 2011

(65) Prior Publication Data

US 2013/0067107 A1   Mar. 14, 2013

(51) Int. Cl.
*G06F 15/16* (2006.01)

(52) U.S. Cl.
USPC ............................. 709/231; 709/224; 709/227

(58) Field of Classification Search
USPC .......................... 709/200–203, 217–227, 231
See application file for complete search history.

(56) References Cited

U.S. PATENT DOCUMENTS

| | | | |
|---|---|---|---|
| 7,698,467 B2 | 4/2010 | Kim et al. | |
| 7,966,382 B2 * | 6/2011 | Ahluwalia et al. | 709/218 |
| 2006/0168219 A1 * | 7/2006 | Ahluwalia et al. | 709/225 |
| 2007/0016654 A1 * | 1/2007 | Bowles et al. | 709/217 |
| 2008/0301743 A1 * | 12/2008 | Vrielink et al. | 725/110 |
| 2009/0248713 A1 | 10/2009 | Park et al. | |
| 2009/0292807 A1 * | 11/2009 | Liu | 709/225 |
| 2010/0235534 A1 | 9/2010 | Min et al. | |
| 2011/0135271 A1 * | 6/2011 | Van Hoff et al. | 386/200 |
| 2011/0302492 A1 * | 12/2011 | Berkoff et al. | 715/709 |

FOREIGN PATENT DOCUMENTS

WO   2007002604 A2   1/2007

OTHER PUBLICATIONS

Kubovy, Jan, "NetworkMedia Content Aggregator for DLNAServer", Retrieved at <<http://support.dce.felk.cvut.cz/mediawiki/images/f/fb/Dp_2011_kubovy_jan.pdf>>, Mar. 1, 2011, pp. 123.

"Majestic software", Retrieved at <<http://www.majesticsoftware.com.au/mms.lml>>, Retrieved Date: Jun. 28, 2011, pp. 2.

Rae, et al., "Home Networkingand Digital Living Networking Alliance", Retrieved at <<http://www.tcs.com/SiteCollectionDocuments/White%20Papers/tcs_hitech_whitepaper_DLNA.pdf>>, Retrieved Date: Jun. 27, 2011, pp. 14.

* cited by examiner

*Primary Examiner* — Moustafa M Meky

(57) ABSTRACT

Given the variety of ways in which devices can connect to a network, and the possibility of incompatible media formats, a digital media controller implements a process through which it determines an optimal connection for playing media from a media server on a media renderer. The digital media controller attempts to connect to the media server and media renderer using the same network interface and protocol if the media server has content in formats which are supported by the media renderer. Otherwise, the digital media controller connects to the media server and the media renderer using the fastest available connections, in the event that the renderer cannot stream directly from the server, whether due to network connectivity or format incompatibility. If a direct wireless connection is available, then it is used only when the digital media controller relays and/or converts the content.

20 Claims, 4 Drawing Sheets

NETWORK SELECTION FOR STREAMING MEDIA AMONG MULTIPLE DEVICES

BACKGROUND

In recent years, new consumer electronics devices have been introduced that can connect to local area computer networks, including home networks. Examples of such devices include printers, DVD players and personal video recorders. A technology called Universal Plug and Play (UPnP) has been developed to provide a common language for such devices to communicate over such networks.

UPnP defines a category of devices called media servers, and another category called media renderers, and a concept called a control point. A control point is an entity which can find UPnP devices and control them. A control point that controls a media renderer is referred to as a digital media controller (DMC).

A common use of UPnP devices is to have a media server that transfers multimedia content (e.g., a digital representation of a movie) to a media renderer device, with the help of a digital media controller. The media server, media renderer and the digital media controller are three separate devices, and the digital media controller orchestrates the connection between the media renderer and the media server. In a possible scenario, the media renderer is a networked television, the media server is a desktop personal computer, and the digital media controller is a portable personal computer such as a notebook computer or a mobile phone. The digital media controller discovers the media server and downloads a catalog of movies from the media server. The digital media controller then instructs the media renderer to initiate a streaming transfer of one the movies from the media server to the media renderer for display on the television screen.

There are several limitations with existing implementations of UPnP and similar networked systems.

First, the media renderer and media server can only communicate directly with each other if they can discover each other on the network, which usually requires the two devices to be connected to the same network segment. While a digital media controller can act as an intermediary, transferring data from the media server to the digital media controller and then from the digital media controller to the media renderer (acting in a role called a "push controller") such operation is undesirable.

Second, if the media renderer does not have the capability to process a file format, data format, or encoded bitstream provided by the media server, then playback directly from the media server to the media renderer is not possible.

These limitations are exacerbated when the connections among devices use different communication media. For example, a television might be connected to the home network using a wireless connection, while the desktop personal computer might be connected to the home network only a wired (Ethernet) connection. The digital media controller, which could be a portable device, might be connected to both the wired and the wireless network simultaneously. It is possible that two devices use different protocols (such as internet protocol version 6 (IPv6) and version 4 (IPv4)), or are on different subnets. In some cases, the wireless connection is through an access point which relays the traffic between devices that want to communicate with each other. Another mode of wireless connection, called Wi-Fi Direct, also can be used. In this mode of operation, two or more devices communicating with each other can form a group, with one of the devices acting as the access point for the group. As long as either the sender or the receiver of the multi-media data is acting as the access point, data does not have to be relayed by a third device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Given the variety of ways in which devices can connect to a network, and the possibility of incompatible media formats, a digital media controller implements a process through which it determines an optimal connection for playing media from a media server on a media renderer. The digital media controller attempts to connect to the media server and media renderer using the same network interface and protocol if the media server has content in formats which are supported by the media renderer. Otherwise, the digital media controller connects to the media server and the media renderer using the fastest available connections, in the event that the renderer cannot stream directly from the server, whether due to network connectivity or format incompatibility. If a direct wireless connection is available, then it is used only when the digital media controller relays and/or converts the content.

Accordingly, in one aspect, the process performed by the digital media controller involves attempting to establish a computer network connection between a digital media controller and the media server and the media renderer using a same network interface and protocol. Such a connection can work if the media server has content in a format supported by the media renderer. If such connection cannot be established, then a connection between the digital media controller and the media server is established using a fastest available connection, and a connection between the digital media controller and the media renderer is established using a fastest available connection. If the media server does not have content in formats which are supported by the media renderer, then a connection is established between the digital media controller and the media server using a fastest available connection, and a connection is established between the digital media controller and the media renderer using a fastest available connection.

In one embodiment, the digital media controller establishes a computer network connection with the media renderer. Then it establishes a computer network connection with the media server. These two connections are initially established so as to optimize streaming from the media server to the media renderer. If possible, both connections use the same network and protocol, avoiding the use of Wi-Fi Direct or other protocol that could involve an access point through which communication flows.

The digital media controller determines if a format of content available on the media server is supported by the media renderer. If not, then the connections with the digital media controller and the media server and media renderer can be changed. For example, if there is a more efficient way to stream content from the media server, to the digital media controller, then to the media renderer, the connections can be changed so as to transfer content from the media server to the digital media controller. In this embodiment, for example, Wi-Fi Direct can be used. The digital media controller converts the content from the format to another format supported by the media renderer. Such conversion can involve transcoding a bitstream from one encoding format to another, converting data formats, or converting file formats or other conversion required to provide for interoperability. The converted content is transferred from the digital media controller to the media renderer. Such transfer can occur as the content is being converted or as a separate step. In these embodiments, the connection between the digital media controller and either the media renderer or the media server can be a direct wireless connection without an intervening access point, such as provided by Wi-Fi-Direct.

In another embodiment, the digital media controller attempts to establish computer network connections that allow the media renderer to stream content directly from the media server. If the media renderer cannot stream content directly from the media server, then the media controller will act as a push controller, and in that case the connections are changed, if possible. In the former case, in one embodiment, direct wireless connections are not used; in the latter case, direct wireless connections can be used if available.

In one embodiment, the digital media controller, media renderer and media server implement a universal plug and play protocol.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
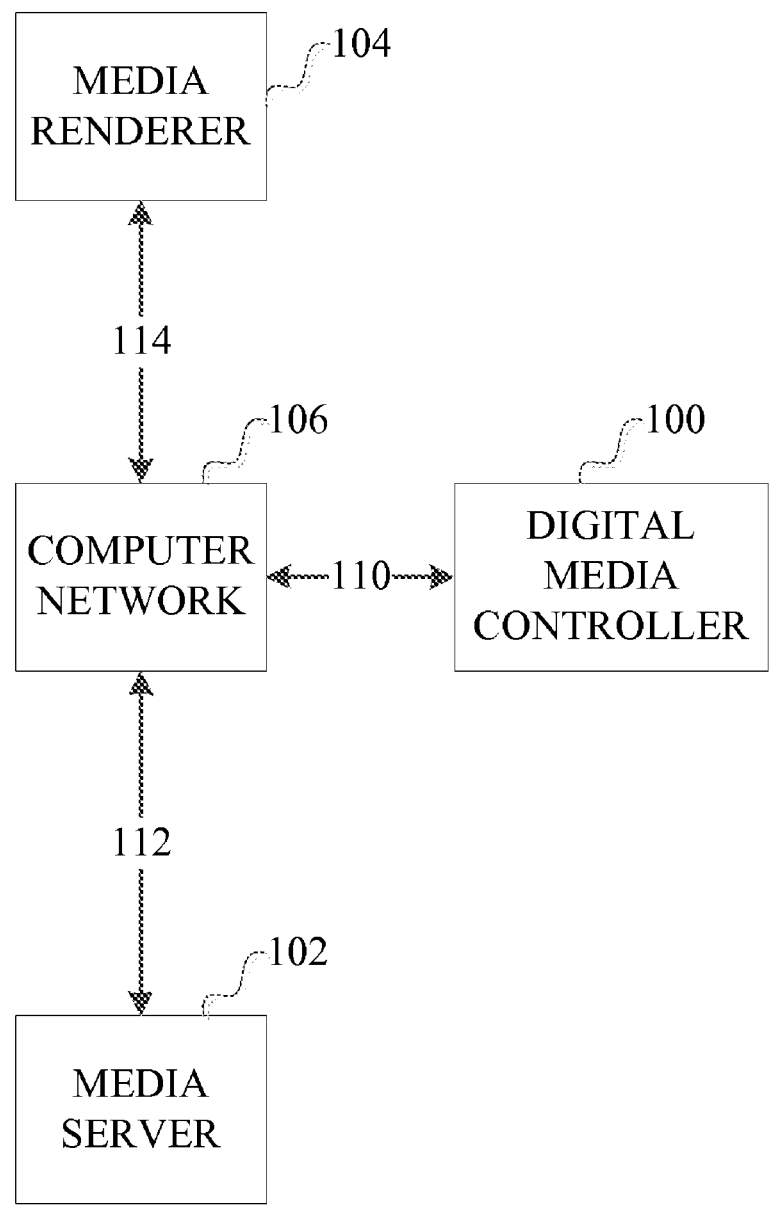
FIG. 1 is a block diagram of an example system in which a digital media controller controls a media renderer and a media server.

The following section provides an example operating environment. Referring to FIG. 1, a digital media controller 100, a media server 102 and a media renderer 104 are connected to each other through a computer network 106. The digital media controller 100 is connected through a first network connection 110. The media server 102 is connected through a second network connection 112. The media renderer 104 is connected through a third network connection 114.

In an example practical configuration, the media server 102 is a desktop personal computer that has storage (not shown) that stores media data such as digital video data files. The second network connection 112 is a wired Ethernet connection that connects to the computer network 106. The computer network 106, as an example, can be implemented using a router, which provides both wired and wireless connections. The media renderer 104, in this example, is a television that plays back received digital video data files, for which the third network connection 114 to the computer network is a wireless connection. The digital media controller 100, in this example, is a mobile computing device, such as a tablet computer, for which the first network connection 110 to the computer network is a wireless connection. In this example, communication among the various devices can be through the UPnP protocol. It should be understood, however, that other protocols can be used.

While the foregoing describes an example practical configuration, such configurations can change in any given installation. For example, a user may decide to connect the digital media controller 100 to the computer network through a wired connection. Also, the digital media controller 100 is implemented so as to anticipate several possible configurations. For example, any of the first, second, or third network connections (110, 112, 114) can be wired or wireless. If wired, the connection can use IPv6, IPv4 or other protocol. Also, if wireless, the connection can be Infrastructure-Wi-Fi, Wi-Fi-Direct, or other protocol. While the configuration shown assumes that the computer network 106 is implemented using a single router with wired and wireless connectivity, the computer network 106 can be arbitrarily complex.

Given this context, an example implementation of network selection will be described in more detail in connection with FIGS. 2-3.

Figure 2:
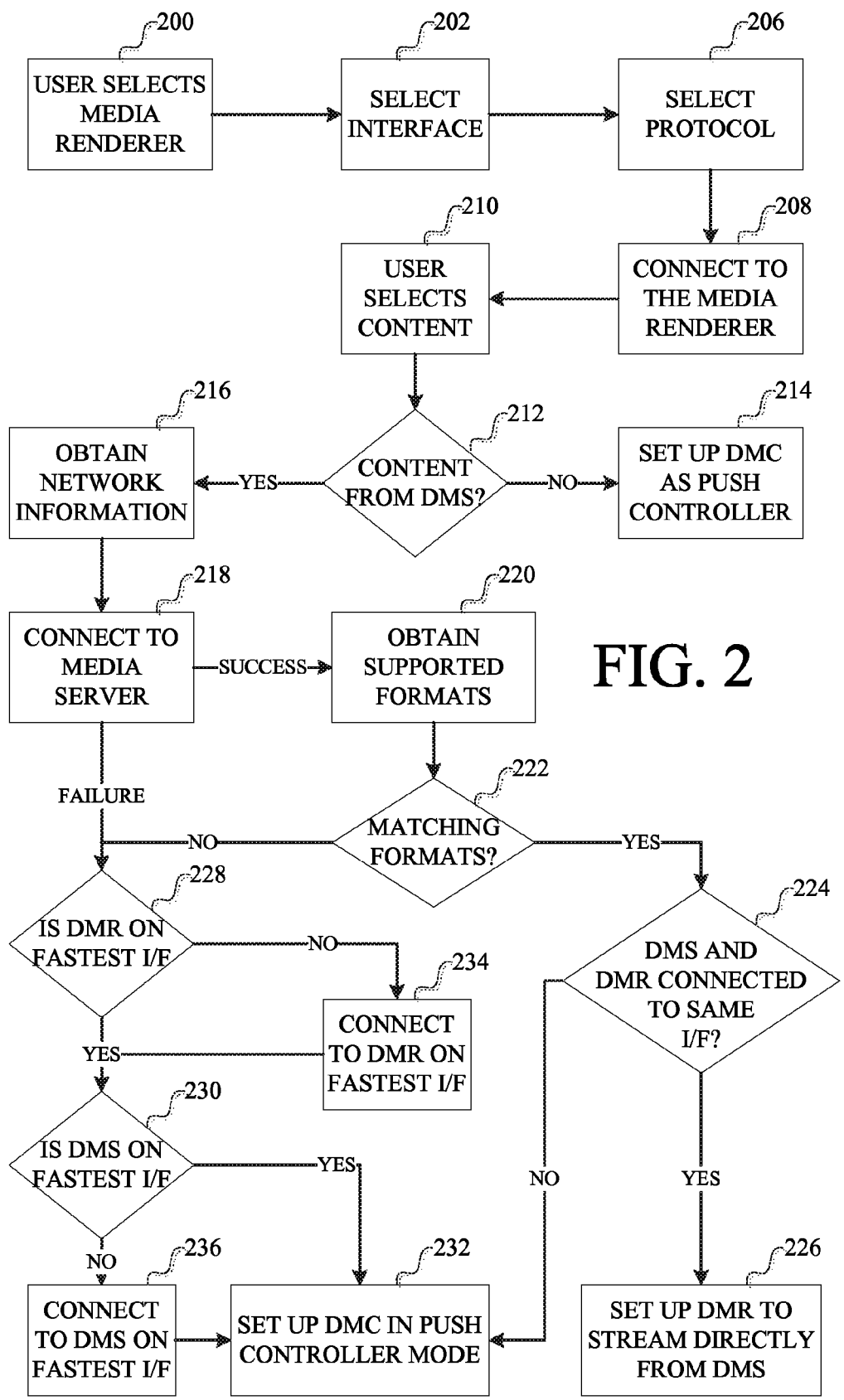
FIG. 2 is a flow chart describing an example process for selecting a network connection.

In the example process in FIG. 2, a user of the digital media controller selects 200 a media renderer to play content. At this point, the digital media controller does not know if the content will originate from the digital media controller or from a digital media server. In this example, the initial assumption is that the content does not originate from a digital media server. In other words, the content is local to the digital media controller or originates from another source on the network, such as a web server on the Internet. It should be understood that alternative implementations can include selecting the media server first, and/or to assume that the content originates from a digital media server.

Based on this initial assumption, the digital media controller selects 202 a network interface to use to connect to the digital media renderer, based on transmit and receive speeds of the network interface. In this context, the "network interface" can be an Ethernet connection or a wireless network connection. A single physical network interface adapter can expose multiple logical network interfaces. For example, if a digital media renderer is reachable using both Infrastructure Mode Wi-Fi and Wi-Fi Direct, then this selection process treats those two options as two separate network interfaces.

For each network interface, there is a concept of a transmit speed and a receive speed. The transmit speed is the speed at which the digital media controller can send data on the interface. The receive speed is the speed at which the digital media controller can receive data. Typically the two speeds are the same, but it is possible for them to be different. If possible, the digital media controller can try to measure the actual speeds. Otherwise, it will use the link layer connection speed multiplied by a scale factor. For Ethernet interfaces, a typical link layer speed is 100 Mbps. In this example implementation, a scale factor of 0.8 is used. Thus, this selection process considers the transmit and receive speeds of such an interface to be 80 Mbps.

For wireless interfaces, in this example implementation, a scale factor of 0.4 is used for Infrastructure Mode, and 0.8 is used for Wi-Fi Direct mode. These two different scale factors result in a preference given to Wi-Fi Direct interfaces over Infrastructure Mode interfaces.

In this example, if the digital media renderer is reachable using Infrastructure Mode Wi-Fi and Wi-Fi Direct, then Wi-Fi Direct is chosen. If a wired connection is also available, the wired connection can be chosen over the Wi-Fi Direct connection. The protocol to be used also can be selected, as shown in 206. For example if IPv6 is available, that is selected over IPv4. If the user has already designated that the content is to originate from a digital media server, then a Wi-Fi-Direct connection can be excluded from the set of possible network interfaces, because using Wi-Fi-Direct could cause the digital media controller to have to relay all of the network traffic.

Given the selected network interface and protocol, the digital media controller connects 208 to the digital media renderer.

After the digital media controller has connected to the digital media renderer, the user selects 210 content to be played on the digital media renderer. If the content does not originate from a digital media server (DMS), as determined at 212, it can be streamed from the digital media controller (DMC) to the digital media renderer using the push controller functionality of the digital media controller, and the digital media controller is set up 214 in that mode. In such a case, the network that was selected for connecting to the digital media renderer is already ideal, and the process ends.

If the content originates from a digital media server, then the digital media controller obtains 216 the network information for the digital media server. Given this network information, the digital media controller attempts to connect 218 to the digital media server through the same non-Wi-Fi-Direct connection as the media renderer. This process is described in more detail below in connection with FIG. 3. In general, the digital media controller attempts to find a network interface that the digital media renderer and the digital media server have in common, excluding Wi-Fi Direct network interfaces. Then, the digital media controller connects the digital media server to a selected one of the interfaces, preferably the fastest among such interfaces. If the digital media renderer is not already connected to this selected interface for streaming from the digital media server, the digital media controller can discard its current connection and connect to the digital media renderer again using the interface that is now selected.

After the digital media controller has successfully connected to both the digital media renderer and the digital media server, it next determines whether the multimedia content on the digital media server is available in a format that is supported by the digital media renderer. It obtains 220 the available formats from the digital media server and the supported formats from the digital media renderer. If the number of matches is one or more, as determined at 222, and if the digital media renderer (DMR) and digital media server (DMS) are connected through the same kind of network interface (I/F) using the same protocol, as determined at 224, then the digital media renderer (DMR) can be set up 226 to receive the content directly from the digital media server (DMS).

However, if there are not compatible formats (determined at 222), then the digital media controller can convert the content on behalf of the digital media server (if a converter is available). Such conversion can involve transcoding a bitstream from one encoding format to another, converting data formats, and/or converting file formats or other conversion required to provide for interoperability. In this case, the digital media renderer streams data from the digital media controller instead of from the digital media server, which can change the ideal choice of network interfaces. For example, with the assumption that the digital media renderer can stream directly from the digital media server, any available Wi-Fi Direct network interface was excluded from the list of considered network interfaces. Now, if the digital media controller can convert content, then it is preferable to connect to the digital media renderer using Wi-Fi Direct. So, as a result of these changed preferences, the process involves re-evaluating the chosen network interfaces and re-connecting to the digital media renderer or digital media server if necessary.

In particular, in FIG. 2, if the content formats are not compatible, or if the connection between the digital media server and digital media renderer is otherwise unsuccessful, the digital media controller acts as a push controller. In this case it selects the fastest connection for each of the other devices. Thus, as indicated at 228, the digital media controller determines if it is connected to the digital media renderer (DMR) through the fastest available connection or interface (I/F). If yes, then the digital media controller determines 230 if it is connected to the digital media server (DMS) through the fastest available connection or interface (I/F). If yes, then the digital media controller (DMC) is set up 232 in push controller mode. If either of steps 230 or 228 indicates that the fastest available connection is not being used, then the digital media controller (DMC) connects to the device through the fastest available interface (I/F) to that device, as indicated at 234 and 236. If a converter between two media formats is available, then data received from the digital media server is input to the converter, the output of which is transmitted to the digital media renderer. This mode also is entered if, at 224, it is determined that the digital media renderer and digital media server are not connected through the same kind of network interface using the same protocol.

In a variation of the process shown in FIG. 2, it is possible for the connection to the digital media server to be completed first. The process is otherwise similar.

Figure 3:
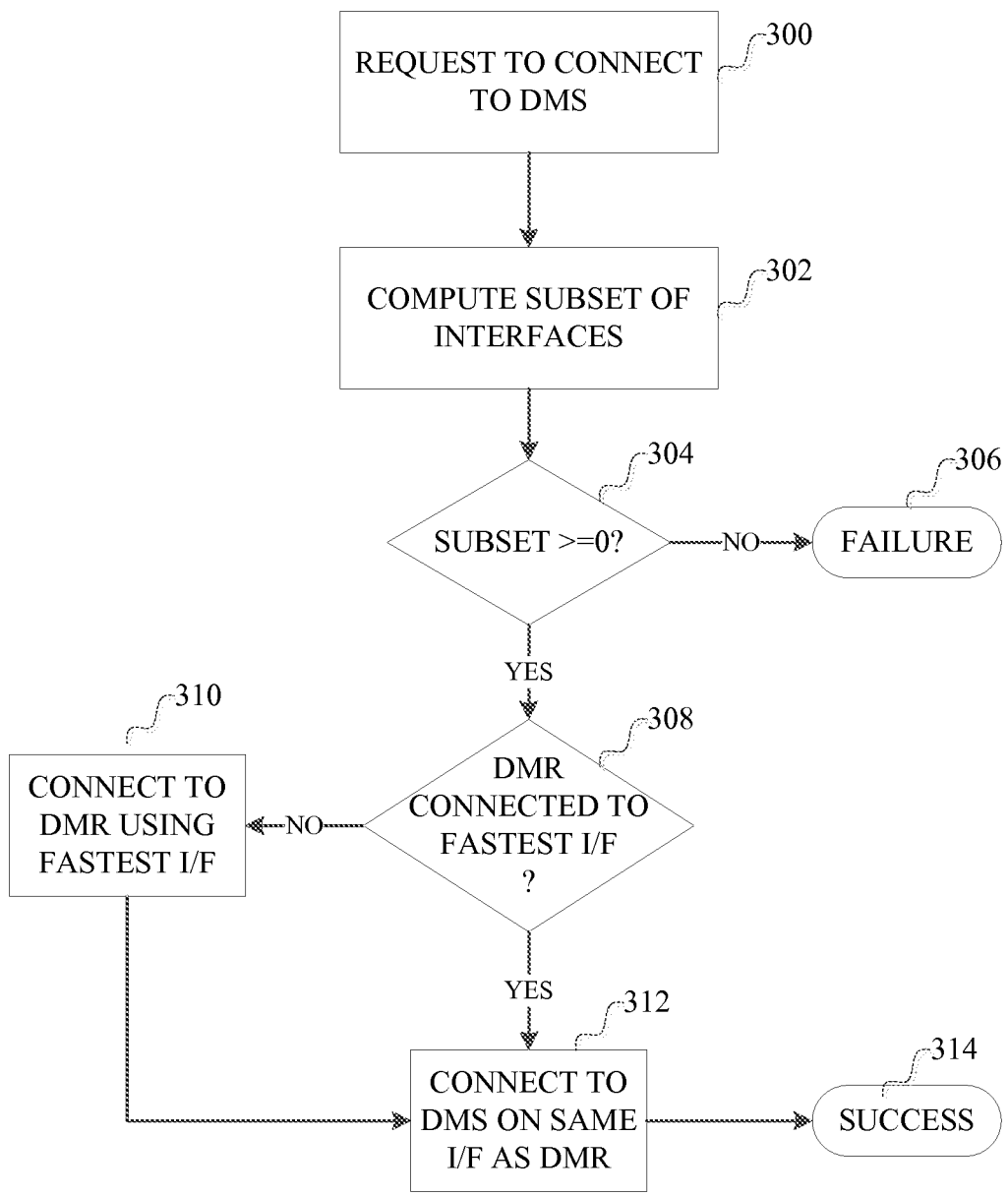
FIG. 3 is a flow chart describing another example process for selecting a network connection.

Referring now to FIG. 3, an example process for attempting to cause the digital media renderer and digital media server to be connected to the same interface will now be described. The process begins by the digital media controller requesting 300 to connect to the digital media server (DMS) on the same interface to which it is connected to the digital media renderer. The digital media controller computes 302 a subset of the non-Wi-Fi Direct network interfaces on which both the digital media renderer and the digital media server are available and on which the digital media server and digital media renderer support the same protocol. If the number of interfaces in this subset is not greater than zero, as determined at 304, then a failure is indicated 306.

Otherwise, there is a possibility for such a connection to be made. Thus, the digital media controller determines 308 if it is already connected to the digital media renderer (DMR) using the fastest available connection or interface (I/F) from this subset. If not, then the digital media controller connects 310 to the digital media renderer (DMR) using this faster connection (I/F). Next, a connection is made 312 to the digital media server (DMS) using the same network interface and protocol (I/F), and success is returned 314.

It should be understood that this approach can be generalized for other types of network interfaces and protocols, and is not limited to IP protocols, Ethernet connections, and wireless connections using Infrastructure-Wi-Fi and Wi-Fi-Direct. Also, while the example of FIG. 2 shows a connection being made to a media renderer first, the connections with the media server and media renderer can be made in any order. The digital media controller attempts to connect to the media server and media renderer using the same network interface and protocol if the media server has content in formats which are supported by the media renderer. In this instance, direct wireless connections can be excluded so as to avoid having the digital media controller acting as an access point. Otherwise, the digital media controller connects to the media server and the media renderer using the fastest available connections, in the event that the renderer cannot stream directly from the server, whether due to network connectivity or format incompatibility. In this instance, the connections can be direct wireless connections.

Having now described an example implementation, a computing environment in which such a digital media controller is designed to operate will now be described. The following description is intended to provide a brief, general description of a suitable computing environment in which this digital media controller can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 4:
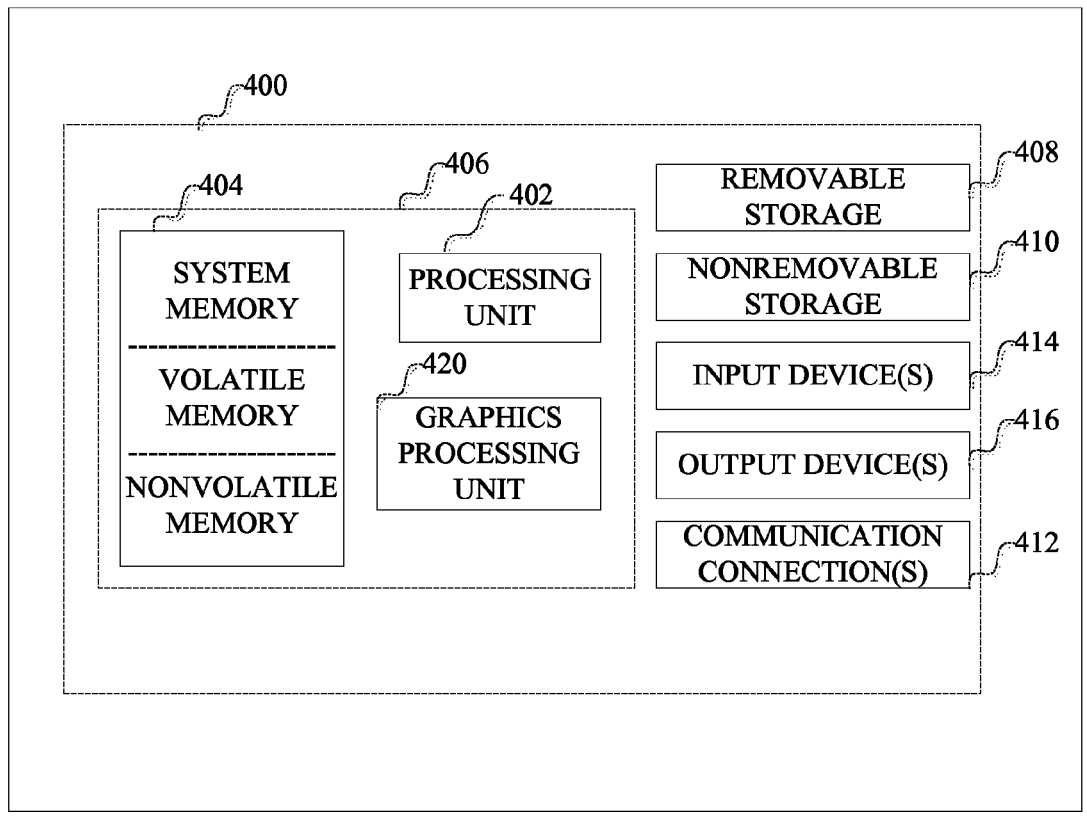
FIG. 4 is a block diagram of an example computing device in which such network selection can be implemented.

FIG. 4 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 4, an example computing environment includes a computing machine, such as computing machine 400. In its most basic configuration, computing machine 400 typically includes at least one processing unit 402 and memory 404. The computing device may include multiple processing units and/or additional co-processing units such as graphics processing unit 420. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, computing machine 400 may also have additional features/functionality. For example, computing machine 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer program instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 400. Any such computer storage media may be part of computing machine 400.

Computing machine 400 may also contain communications connection(s) 412 that allow the device to communicate with other devices. Communications connection(s) 412 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 400 may have various input device(s) 414 such as a display, a keyboard, mouse, pen, camera, touch input device, and so on. Output device(s) 416 such as speakers, a printer, and so on may also be included. All of these devices are well known in the art and need not be discussed at length here.

Such a system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
   if a media server has content in a format supported by a media renderer, attempting to establish a computer network connection between a digital media controller and the media server and the media renderer using a same network interface and protocol;
   if such connection cannot be established, then establishing a connection between the digital media controller and the media server using a fastest available connection, and establishing a connection between the digital media controller and the media renderer using a fastest available connection; and
   if the media server does not have content in formats which are supported by the media renderer, then establishing a connection between the digital media controller and the media server using a fastest available connection, and establishing a connection between the digital media controller and the media renderer using a fastest available connection.

2. The computer-implemented process of claim 1, further comprising:
   establishing a computer network connection between the digital media controller and the media renderer;
   establishing a computer network connection between the digital media controller and the media server;
   determining if a format of content available on the media server is supported by the media renderer; and
   changing the connections with the digital media controller and the media server and media renderer if the format of content is not supported by the media renderer.

3. The computer implemented process of claim 2, further comprising:
 transferring content from the media server to the digital media controller;
 converting the content from the format to another format supported by the media renderer; and
 transferring the converted content from the digital media controller to the media renderer.

4. The computer-implemented process of claim 2, wherein the connection between the digital media controller and the media renderer is a direct wireless connection without an intervening access point.

5. The computer-implemented process of claim 2, wherein the connection between the digital media controller and the media server is a direct wireless connection without an intervening access point.

6. The computer-implemented process of claim 1, further comprising:
 establishing a computer network connection between the digital media controller and the media renderer;
 establishing a computer network connection between the digital media controller and the media server;
 transferring content from the media server to the digital media controller; and
 transferring the content from the digital media controller to the media renderer.

7. The computer-implemented process of claim 1, wherein attempting to establish the computer network connection between a digital media controller and the media server and the media renderer using the same network interface and protocol excludes direct wireless connections.

8. The computer-implemented process of claim 7, wherein establishing the connection between the digital media controller and the media server using the fastest available connection includes using a direct wireless connection, and establishing the connection between the digital media controller and the media renderer using the fastest available connection includes using a direct wireless connection.

9. The computer-implemented process of claim 1, wherein establishing the connection between the digital media controller and the media server using the fastest available connection includes using a direct wireless connection, and establishing the connection between the digital media controller and the media renderer using the fastest available connection includes using a direct wireless connection.

10. The computer implemented process of claim 1, further comprising:
 establishing a computer network connection between the digital media controller and the media renderer;
 establishing a computer network connection between the digital media controller and the media server;
 changing the connections with the digital media controller and the media server and media renderer if a connection on the same network interface and protocol is not available.

11. The computer implemented process of claim 1, wherein the digital media controller, media renderer and media server implement a universal plug and play protocol.

12. A computing machine comprising:
 a processor; and
 computer storage media storing computer program instructions which, when processed by the processor, instruct the processor to perform a process comprising:
  if a media server has content in a format supported by a media renderer, attempting to establish a computer network connection between a digital media controller and the media server and the media renderer using a same network interface and protocol;
  if such connection cannot be established, then establishing a connection between the digital media controller and the media server using a fastest available connection, and establishing a connection between the digital media controller and the media renderer using a fastest available connection; and
  if the media server does not have content in formats which are supported by the media renderer, then establishing a connection between the digital media controller and the media server using a fastest available connection, and establishing a connection between the digital media controller and the media renderer using a fastest available connection.

13. The computing machine of claim 12, wherein the process further comprises:
 establishing a computer network connection between the digital media controller and the media renderer;
 establishing a computer network connection between the digital media controller and the media server;
 determining if a format of content available on the media server is supported by the media renderer; and
 changing the connections with the digital media controller and the media server and media renderer if the format of content is not supported by the media renderer.

14. The computing machine of claim 13, wherein the process further comprises:
 transferring content from the media server to the digital media controller;
 converting the content from the format to another format supported by the media renderer; and
 transferring the converted content from the digital media controller to the media renderer.

15. The computing machine of claim 12, wherein the process further comprises:
 establishing a computer network connection between the digital media controller and the media renderer;
 establishing a computer network connection between the digital media controller and the media server;
 transferring content from the media server to the digital media controller; and
 transferring the content from the digital media controller to the media renderer.

16. The computing machine of claim 15, wherein the connection between the digital media controller and the media renderer is a direct wireless connection without an intervening access point.

17. The computing machine of claim 15, wherein the connection between the digital media controller and the media server is a direct wireless connection without an intervening access point.

18. The computing machine of claim 12, wherein attempting to establish the computer network connection between a digital media controller and the media server and the media renderer using the same network interface and protocol excludes direct wireless connections.

19. The computing machine of claim 18, wherein establishing the connection between the digital media controller and the media server using the fastest available connection includes using a direct wireless connection, and establishing the connection between the digital media controller and the media renderer using the fastest available connection includes using a direct wireless connection.

20. The computing machine of claim 12, wherein the process further comprises:

establishing a computer network connection between the digital media controller and the media renderer;

establishing a computer network connection between the digital media controller and the media server;

changing the connections with the digital media controller and the media server and media renderer if a connection on the same network interface and protocol is not available.

* * * * *